US012578990B2

(12) United States Patent
Sanchez et al.

(10) Patent No.: US 12,578,990 B2
(45) Date of Patent: Mar. 17, 2026

(54) SIMULATION SYSTEM AND METHOD

(71) Applicant: GM GLOBAL TECHNOLOGY OPERATIONS LLC, Detroit, MI (US)

(72) Inventors: Hector Sanchez, Commerce, MI (US); Ningsheng Qiao, Troy, MI (US); Sudhakaran Maydiga, Troy, MI (US); Steve DiBella, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 967 days.

(21) Appl. No.: 17/664,962

(22) Filed: May 25, 2022

(65) Prior Publication Data

US 2023/0409383 A1    Dec. 21, 2023

(51) Int. Cl.
G06F 9/46 (2006.01)
G06F 9/48 (2006.01)
G06F 9/54 (2006.01)

(52) U.S. Cl.
CPC ............ G06F 9/4881 (2013.01); G06F 9/541 (2013.01)

(58) Field of Classification Search
CPC .......... G06F 9/541; G06F 9/542; G06F 9/544; G06F 9/546; G06F 9/4881; G06F 9/5038; G06F 9/5044; G06F 9/505; G06F 9/5055; G06F 9/5033; G06F 11/13; G06F 11/15; G06F 11/18; G06F 11/3457; G06F 11/3461; G06F 30/20; G06F 30/33; G06F 30/3308; G06F 30/331; G06F 30/3312; G06F 30/367
See application file for complete search history.

(56) References Cited

U.S. PATENT DOCUMENTS

| | | | | |
|---|---|---|---|---|
| 6,286,027 | B1 * | 9/2001 | Dwyer, III ............ | G06F 9/4843 |
| | | | | 712/228 |
| 10,884,902 | B2 * | 1/2021 | Kislovskiy .......... | G06F 11/0739 |
| 11,886,900 | B1 * | 1/2024 | Eyberg ................. | G06F 9/4881 |
| 2006/0271931 | A1 * | 11/2006 | Harris ..................... | G06F 9/526 |
| | | | | 718/1 |
| 2008/0074426 | A1 * | 3/2008 | Stein ..................... | H04N 19/61 |
| | | | | 345/502 |

(Continued)

*Primary Examiner* — April Y Blair
*Assistant Examiner* — Zhi Chen
(74) *Attorney, Agent, or Firm* — Ingrassia Fisher & Lorenz, LLP | IF&L

(57) ABSTRACT

A method in a simulation system includes: implementing a plurality of threads using an operating system that allocates a time quantum of a predetermined execution time to each thread during which the thread will not be preempted during execution; monitoring timing requirements of each of a plurality of tasks for a plurality of distinct virtual platforms; segmenting each of the plurality of tasks into one or more sequences of programmed instructions that can execute in a thread within a time quantum; providing the one or more sequences of programmed instructions for each of the plurality of tasks as a plurality of programmed instruction sequences with specific timing requirements; scheduling each of the plurality of programed instruction sequences, based on the specific timing requirements, to execute in one of the plurality of threads at an appropriate time; and performing real-time simulation of application code utilizing available computing compacity at full capacity.

20 Claims, 5 Drawing Sheets

(56) References Cited

U.S. PATENT DOCUMENTS

| | | | | |
|---|---|---|---|---|
| 2008/0086733 | A1* | 4/2008 | Jensen | G06F 9/4881 |
| | | | | 718/102 |
| 2008/0127119 | A1* | 5/2008 | Kasman | G06F 11/3644 |
| | | | | 717/130 |
| 2009/0049449 | A1* | 2/2009 | Varadarajan | G06F 9/5016 |
| | | | | 718/104 |
| 2009/0233622 | A1* | 9/2009 | Johnson | G06F 16/245 |
| | | | | 455/456.3 |
| 2010/0061239 | A1* | 3/2010 | Godbole | H04L 47/50 |
| | | | | 370/235 |
| 2013/0087005 | A1* | 4/2013 | Van Lookeren Campagne | |
| | | | | G09B 9/12 |
| | | | | 74/490.08 |
| 2013/0227587 | A1* | 8/2013 | Deng | G06F 9/544 |
| | | | | 719/313 |
| 2018/0060456 | A1* | 3/2018 | Phatak | G06F 9/5077 |
| 2019/0130056 | A1* | 5/2019 | Tascione | G06F 30/20 |
| 2020/0167687 | A1* | 5/2020 | Genc | G06F 30/20 |
| 2020/0282561 | A1* | 9/2020 | Dey | G06F 16/3344 |
| 2021/0201056 | A1* | 7/2021 | Potnis | G06N 3/0475 |
| 2022/0309199 | A1* | 9/2022 | Rao | G06F 30/20 |
| 2022/0366636 | A1* | 11/2022 | Lasram | G06V 10/803 |
| 2022/0398168 | A1* | 12/2022 | Singhal | G06F 11/3433 |

* cited by examiner

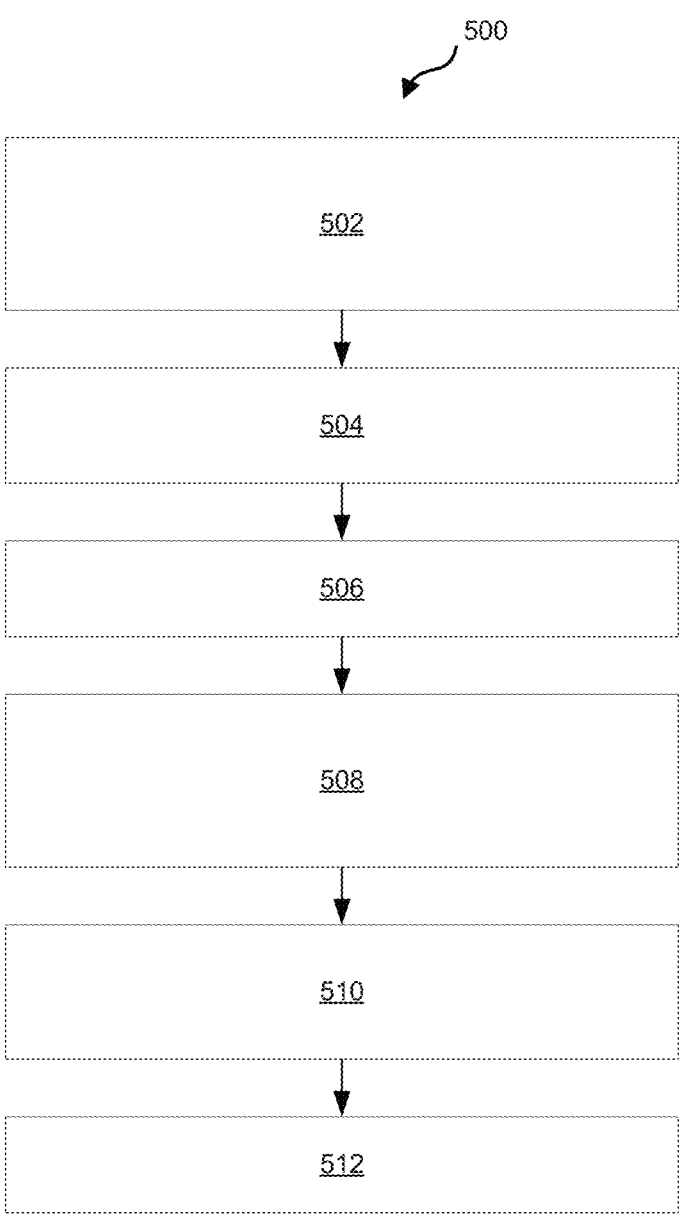
<u>FIG. 5</u>

SIMULATION SYSTEM AND METHOD

INTRODUCTION

The technical field generally relates to systems, methods, and apparatuses for simulating electronic systems and more particularly relates to systems, methods, and apparatuses for simulating multiple concurrently operating electronic systems.

In the last several decades vehicles have undergone a huge change from being mainly mechanical machines to digital hardware (HW)/software (SW) centric vehicular systems. During this time, vehicular SW has become highly diverse, ranging from infotainment to safety-critical real-time control applications. With Advanced Driver Assistance Systems (ADAS) targeting autonomous driving scenarios, a high-end car may contain around 100 million lines of source code. Regarding automotive HW, a high-end vehicle may have around 100 networked electronic control units (ECUs) with around 250 embedded and graphic processors.

HW/SW functional security has become a high priority for automotive systems. With exponentially rising amounts of SW, emerging complex multi-core and many-core technologies, and demanding requirements posed by functional safety standards, automotive HW/SW system development and validation have become immensely difficult. Virtual platform (VP) technology have been proposed to simulate individual HW/SW units.

But because vehicles are highly heterogeneous, full-vehicle simulation is needed to capture the interactions of individual subsystems (domains) since strong inter-dependencies exist between them.

It is therefore desirable for improved methods, systems, and apparatuses for simulating multiple concurrently operating electronic systems. Furthermore, other desirable features and characteristics of the present disclosure will become apparent from the subsequent detailed description and the appended claims, taken in conjunction with the accompanying drawings and the foregoing technical field and background.

The information disclosed in this introduction is only for enhancement of understanding of the background of the present disclosure and therefore it may contain information that does not form the prior art that is already known in this country to a person of ordinary skill in the art.

SUMMARY

In one embodiment, a simulation system is provided. The simulation system comprises: a plurality of computing resources including a plurality of processor cores and an operating system (e.g., windows or Linux) configured to implement a plurality of threads of execution (threads) using the plurality of processor cores, wherein the operating system is configured to allocate a time quantum (e.g., approximately 10-15 ms) of a predetermined execution time to each thread during which the thread will not be preempted during execution. The simulation system further comprises a multi-thread scheduler configured to: monitor timing requirements of each of a plurality of tasks included in application code for a plurality of distinct virtual platforms, segment each of the plurality of tasks into one or more sequences of programmed instructions that can complete execution in a thread within the time quantum, and provide the one or more sequences of programmed instructions for each of the plurality of tasks as a plurality of programmed instruction sequences with specific timing requirements. The simulation system further comprises an environment manager configured to schedule each of the plurality of programed instruction sequences, based on the specific timing requirements, to execute in one of the plurality of threads at an appropriate time, wherein the simulation system provides real-time simulation of application code utilizing available computing compacity at full capacity.

In one embodiment, the environment manager is further configured to generate a plurality of simulation windows, each simulation window configured for executing a plurality of programmed instruction sequences with specific timing requirements for a specific virtual platform, wherein the plurality of simulation windows facilitates multi-domain simulation of the plurality of virtual platforms.

In one embodiment, the environment manager further comprises an inter-processor communication (IPC) application programming interface (API) for facilitating communication between programmed instruction sequences executing in different simulation windows for different virtual platforms.

In one embodiment, the IPC API facilitates communication between virtual platforms executing in different simulation windows based on: receiving communications from one virtual platform that is directed to another virtual platform; building a transmitter message signal circular queue for receiving the communications; providing a balanced IPC handler for handling IPC in the transmitter message signal circular queue; building a multi-thread semaphore protected message circular queue for the IPC handled by the IPC handler; and providing a shared IPC pool of Kernel objects handlers for scheduling virtual platform activations to receive communications.

In one embodiment, the IPC API facilitates concurrent multi-domain simulation of multiple virtual platforms through a network communication protocol such as controller area network (CAN) or Ethernet.

In one embodiment, the IPC API facilitates concurrent multi-domain simulation of multiple virtual platforms through communication with a simulator.

In one embodiment, the IPC API facilitates concurrent multi-domain simulation of multiple virtual platforms through communication with a real world controller.

In one embodiment, the IPC API facilitates concurrent multi-domain simulation of multiple virtual platforms through providing a memory probe graphical user interface.

In one embodiment, the IPC API facilitates concurrent multi-domain simulation of multiple virtual platforms through providing a conditions probe.

In one embodiment, the environment manager further comprises a time sync manager configured to retrieve each of the plurality of programed instruction sequences for a virtual platform and schedule time synchronized execution of each of the plurality of programed instruction sequences in one of the simulation windows.

In one embodiment, each simulation window represents a functional mock-up unit (FMU) and a first executing FMU is designated as a primary FMU process and subsequent executing FMUs are designated as secondary FMU processes, wherein the primary FMU process generates a clock signal used for synchronizing the operation of quantum tasks in the primary FMU process and quantum tasks in the secondary FMU processes.

In another embodiment, a method in a simulation system is disclosed. The method comprises: implementing a plurality of threads of execution (threads) using a plurality of processor cores and an operating system that allocates a time quantum (e.g., approximately 10-15 ms) of a predetermined execution time to each thread during which the thread will not be preempted during execution; monitoring timing requirements of each of a plurality of tasks included in application code for a plurality of distinct virtual platforms; segmenting each of the plurality of tasks into one or more sequences of programmed instructions that can complete execution in a thread within a time quantum; providing the one or more sequences of programmed instructions for each of the plurality of tasks as a plurality of programmed instruction sequences with specific timing requirements; scheduling each of the plurality of programed instruction sequences, based on the specific timing requirements, to execute in one of the plurality of threads at an appropriate time; and performing real-time simulation of application code utilizing available computing compacity at full capacity.

In one embodiment, the method further includes generating a plurality of simulation windows, each simulation window configured for executing a plurality of programmed instruction sequences with specific timing requirements for a specific virtual platform, wherein the plurality of simulation windows facilitates multi-domain simulation of the plurality of virtual platforms.

In one embodiment, the method further includes providing an inter-processor communication (IPC) application programming interface (API) for facilitating communication between programmed instruction sequences executing in different simulation windows for different virtual platforms.

In one embodiment, the method further includes facilitating communication between virtual platforms executing in different simulation windows based on: receiving communications from one virtual platform that is directed to another virtual platform; building a transmitter message signal circular queue for receiving the communications; providing a balanced IPC handler for handling IPC in the transmitter message signal circular queue; building a multi-thread semaphore protected message circular queue for the IPC handled by the IPC handler; and providing a shared IPC pool of Kernel objects handlers for scheduling virtual platform activations to receive communications.

In one embodiment, the method further includes facilitating concurrent multi-domain simulation of multiple virtual platforms through a network communication protocol such as controller area network (CAN) or Ethernet to a simulator or a real controller.

In one embodiment, the method further includes facilitating concurrent multi-domain simulation of multiple virtual platforms through providing a memory probe graphical user interface or a conditions probe.

In one embodiment, the method further includes retrieving each of the plurality of programmed instruction sequences for a virtual platform and scheduling time synchronized execution of each of the plurality of programed instruction sequences in one of the simulation windows.

In one embodiment, each simulation window represents a functional mock-up unit (FMU) and a first executing FMU is designated as a primary FMU process and subsequent executing FMUs are designated as secondary FMU processes, wherein the primary FMU process generates a clock signal used for synchronizing the operation of quantum tasks in the primary FMU process and quantum tasks in the secondary FMU processes.

In another embodiment, a non-transitory computer readable medium encoded with programming instructions configurable to cause a simulation system to perform a method is disclosed. The method includes: implementing a plurality of threads of execution (threads) using a plurality of processor cores and an operating system that allocates a time quantum (e.g., approximately 10-15 ms) of a predetermined execution time to each thread during which the thread will not be preempted during execution; monitoring timing requirements of each of a plurality of tasks included in application code for a plurality of distinct virtual platforms; segmenting each of the plurality of tasks into one or more sequences of programmed instructions that can complete execution in a thread within a time quantum; providing the one or more sequences of programmed instructions for each of the plurality of tasks as a plurality of programmed instruction sequences with specific timing requirements; scheduling each of the plurality of programed instruction sequences, based on the specific timing requirements, to execute in one of the plurality of threads at an appropriate time; and performing real-time simulation of application code utilizing available computing compacity at full capacity.

In one embodiment of the non-transitory computer readable medium, the method further includes generating a plurality of simulation windows, each simulation window configured for executing a plurality of programmed instruction sequences with specific timing requirements for a specific virtual platform, wherein the plurality of simulation windows facilitates multi-domain simulation of the plurality of virtual platforms.

In one embodiment of the non-transitory computer readable medium, the method further includes providing an inter-processor communication (IPC) application programming interface (API) for facilitating communication between programmed instruction sequences executing in different simulation windows for different virtual platforms.

In one embodiment of the non-transitory computer readable medium, the method further includes facilitating communication between virtual platforms executing in different simulation windows based on: receiving communications from one virtual platform that is directed to another virtual platform; building a transmitter message signal circular queue for receiving the communications; providing a balanced IPC handler for handling IPC in the transmitter message signal circular queue; building a multi-thread semaphore protected message circular queue for the IPC handled by the IPC handler; and providing a shared IPC pool of Kernel objects handlers for scheduling virtual platform activations to receive communications.

In one embodiment of the non-transitory computer readable medium, the method further includes facilitating concurrent multi-domain simulation of multiple virtual platforms through a network communication protocol such as controller area network (CAN) or Ethernet to a simulator or a real controller.

In one embodiment of the non-transitory computer readable medium, the method further includes facilitating concurrent multi-domain simulation of multiple virtual platforms through providing a memory probe graphical user interface or a conditions probe.

In one embodiment of the non-transitory computer readable medium, the method further includes retrieving each of the plurality of programmed instruction sequences for a virtual platform and scheduling time synchronized execution of each of the plurality of programed instruction sequences in one of the simulation windows.

In one embodiment of the non-transitory computer readable medium, each simulation window represents a functional mock-up unit (FMU) and a first executing FMU is designated as a primary FMU process and subsequent executing FMUs are designated as secondary FMU processes, wherein the primary FMU process generates a clock signal used for synchronizing the operation of quantum tasks in the primary FMU process and quantum tasks in the secondary FMU processes.

BRIEF DESCRIPTION OF THE DRAWINGS

The exemplary embodiments will hereinafter be described in conjunction with the following drawing figures, wherein like numerals denote like elements, and wherein:

FIG. 5 is a process flow chart depicting an example process for simulating multiple virtual platforms concurrently, in accordance with an embodiment.

DETAILED DESCRIPTION

Figure 1:
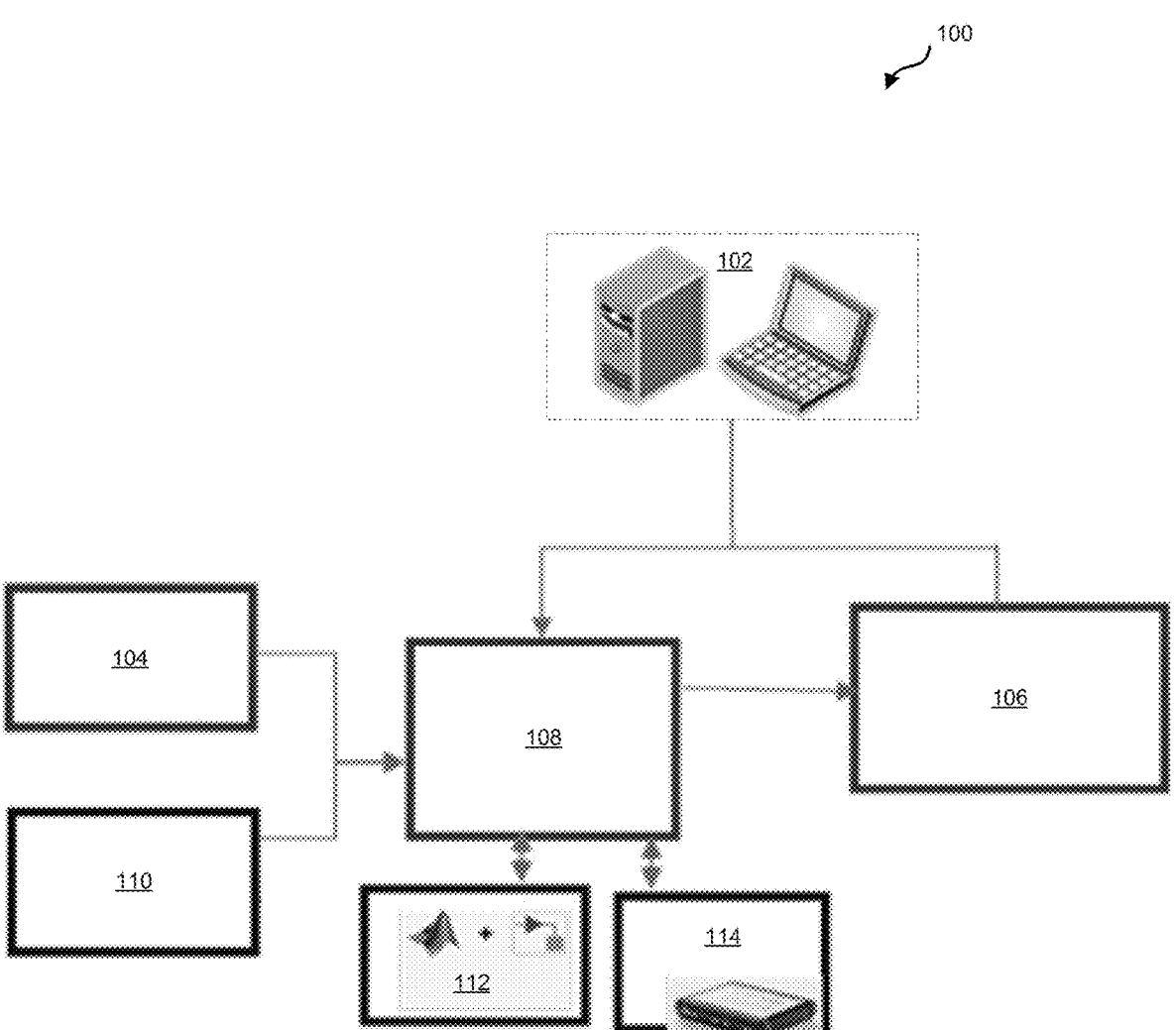
FIG. 1 is a block diagram depicting an example simulation system, in accordance with an embodiment.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

In the last several decades vehicles have undergone a huge change from being mainly mechanical machines to digital hardware (HW)/software (SW) centric vehicular systems. During this time, vehicular SW has become highly diverse, ranging from infotainment to safety-critical real-time control applications. With Advanced Driver Assistance Systems (ADAS) targeting autonomous driving scenarios, a high-end car may contain around 100 million lines of source code. Regarding automotive HW, a high-end vehicle may have around 100 networked electronic control units (ECUs) with around 250 embedded and graphic processors.

HW/SW functional security has become a high priority for automotive systems. With exponentially rising amounts of SW, emerging complex multi-core and many-core technologies, and demanding requirements posed by functional safety standards, automotive HW/SW system development and validation have become immensely difficult. Virtual platform (VP) technology have been proposed to simulate individual HW/SW units under multiple operating system environments such as Windows, Linux environments.

But because vehicles are highly heterogeneous, full-vehicle simulation is needed to capture the interactions of individual subsystems (domains) since strong inter-dependencies exist between them. This limits the usage of virtual platforms alone and calls for modeling and simulation techniques beyond domain boundaries. Multi-domain co-simulation is needed. For example, in case of the simulation of an electric vehicle's power connector: the electrical, mechanical, and thermal properties of the device influence one another significantly, and thus need to be considered together. Similarly, the behavior of ADAS applications is not just influenced by the HW/SW systems embedding them but also physical inputs coming from the environment (e.g., temperature, road properties, atmospheric conditions), captured by peripheral devices (e.g., sensors).

The apparatus, systems, techniques, and articles disclosed herein provide for multi-domain simulation. The apparatus, systems, techniques, and articles disclosed herein transform VPs into Functional Mock-Up Units (FMUs) for multi-domain simulation.

The apparatus, systems, techniques, and articles disclosed herein provide an improvement to computer technology. The disclosed apparatus, systems, techniques, and articles provide a simulation environment for multi-domain simulation of different HW/SW systems. The disclosed apparatus, systems, techniques, and articles provide a special purpose simulation machine that can perform multi-domain simulation.

FIG. 1 is a block diagram depicting an example simulation system 100. The example simulation system 100 includes computing resources 102, an operating system 104, and a multi-thread scheduler 106 that work together with an environment manager (not shown) to accomplish simulation execution 108. The environment manager executes application code 110 and applies inputs from a simulation model 112. The simulation model 112 could be plant models, sensor models, smart actuator models made by CAE modeling tools or simulation modeling tools (such as from MATLAB and/or SIMULINK that simulate real world examples) and/or inputs from one or more virtual controllers 114 represented as an electronic control unit (ECU) in a motor vehicle, to perform multi-domain simulation.

The computing resources 102 may comprise server and/or laptop resources that can be used for computing. The computing resources 102 may include a plurality of executing cores, clock speed, memory, etc.

The operating system 104 includes standard operating system primitives (e.g., Windows, Linux) plus specialized simulation measurement tools (e.g., INCA, XCP). The operating system 104 implements a plurality of threads of execution (threads) using the computing resources 102 including the plurality of processor cores. The operating system 104 enables the simulation system 100 to simulate the execution of application code 110 as it would be executed in real-world systems such as ECUs in a motor vehicle. The operating system 104 performs tasks that would be performed on a real-world system using threads. The operating system 104 is configured to allocate a time quantum of a predetermined execution time (approximately 10-15 ms) to each thread during which the thread will not be preempted during execution.

The multi-thread scheduler 106 is a balanced dynamic multi-thread scheduler that is configured to define thread priorities, scheduling, affinities, and quantum. The multi-thread scheduler 106 is configured to monitor timing requirements of each of plurality of tasks included in the application code 110, segment each of the plurality of tasks into one or more sequences of programmed instructions that can complete execution in a thread within the time quantum and provide the one or more sequences of programmed instructions for each of the plurality of tasks as a plurality of programmed instruction sequences with specific timing requirements.

The application code 110 is the software (SW) for the systems under test such as virtual ECUs (vECUs). The example application code 110 comprises application code for a plurality of ECUs in a motor vehicle. The simulation model 112 simulates inputs for the application code 110, such as braking, acceleration, etc. The one or more virtual controllers 114 represent hardware units (e.g., real ECUs) that would be in a real vehicle.

The environment manager, based on the various inputs, simulates tasks from the application code. The environment manager is configured to schedule each of the plurality of programed instruction sequences, based on the specific timing requirements, to execute in one of the plurality of threads at an appropriate time. The environment manager enables the simulation system 100 to provide real-time simulation of the application code 110 utilizing available computing compacity at full capacity. The environment manager is configured to utilize each available thread provided via the computing resources 102 and operating system 104 to execute the plurality of programmed instruction sequences in accordance with their specific timing requirements.

Figure 2:
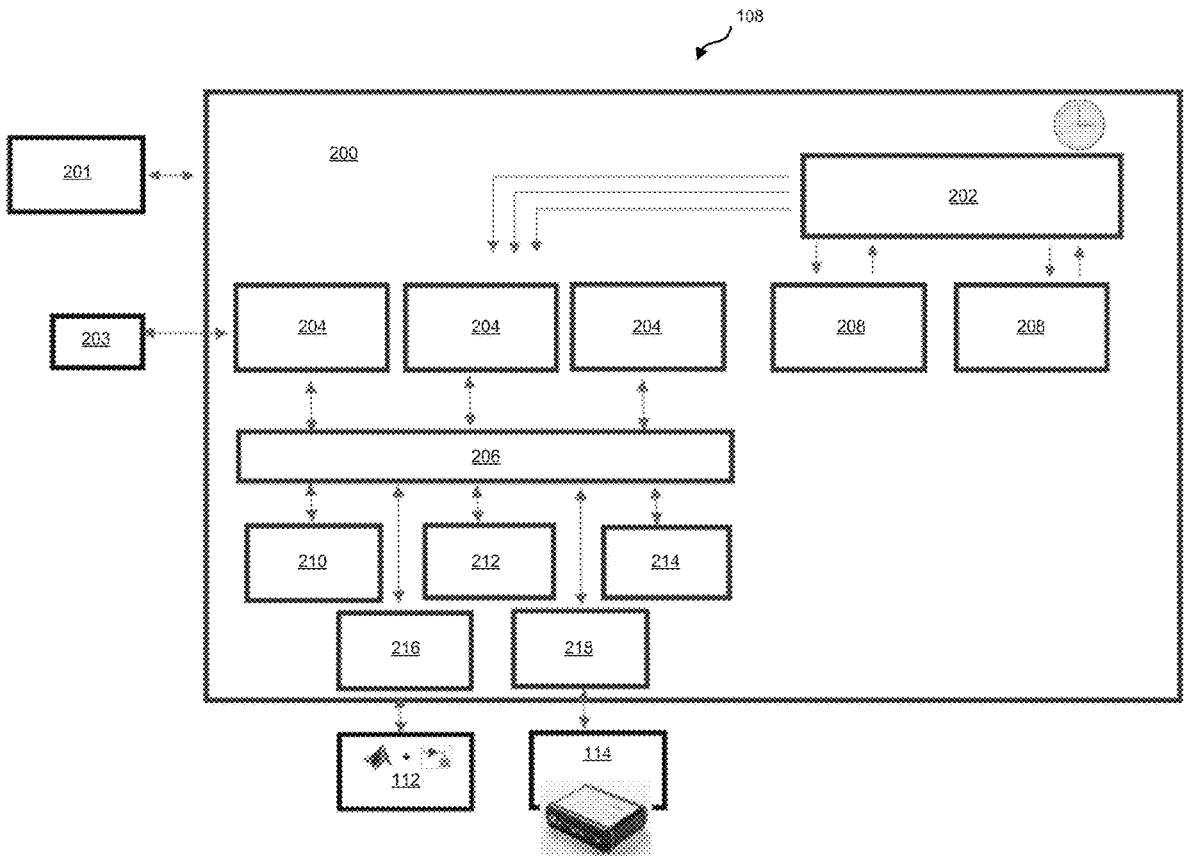
FIG. 2 is a block diagram depicting example simulation execution, in accordance with an embodiment.

FIG. 2 is a block diagram depicting example simulation execution 108. The example simulation execution 108 is performed using an operating system 201 (e.g., Windows, Linux) and its APIs (application programming interfaces), simulation measurement tools 203, such as INCA (Integrated Calibration and Application Tool) and XCP (Universal Measurement and Calibration Protocol) and is managed by an environment manager 200. The example environment manager 200 transforms a plurality of VPs 208 (e.g., vECUs), into a plurality of FMUs, and manages multi-domain simulation of the multiple FMUs. The example environment manager 200 includes a time sync manager 202, provides a plurality of simulation windows 204, and includes an inter-processor communication (IPC) API 206.

The simulation measurement tool such as INCA is a software tool that provides an automotive-specific environment for the measurement, calibration, and diagnostics of electronic controls in a vehicle. It integrates a wide variety of ECU and bus interfaces and measuring devices.

XCP is a high-level protocol for connecting calibration systems to ECUs (electronic control units). XCP allows systems to acquire, stimulate, and calibrate data in ECUs.

The time sync manager 202 is processor implemented and configured to retrieve each of the plurality of programed instruction sequences from the application code for a VP 208 and schedule time synchronized execution of each of the plurality of programed instruction sequences in one of the simulation windows 204 thereby transforming the VP into an FMU. Each of the example VPs 208 comprises target binary code that is being tested before use in a real hardware. The time sync manager 202, based on the specific timing requirements of each programmed instruction sequence that can be executed within a predetermined time quantum for the tasks of a VP 208, schedules each programmed instruction sequence at an appropriate time for execution in an available simulation window 204.

The example environment manager 200 utilizes all available computing resources and makes available as many simulation windows 204 as the available computing resources can support. Each simulation windows 204 is used to simulate execution of one or more programmed instruction sequences that can be executed within the predetermined time quantum for the tasks of a VP 208. Each simulation windows 204 has access to the IPC API 206.

The IPC API 206 provides a methodology for inter-processor communication between different FMUs in the simulation windows 204 to allow for multi-domain simulation. The IPC API 206 provides a virtual memory bus and a methodology to store data in local memory and/or memory in a cloud-based system. The IPC API 206 provides input data to simulation windows 204 (from local memory and/or a memory in a cloud-based system). The IPC API 206 transfers data between simulation windows 204. The IPC API 206 provides access to memory (local or cloud-based) for use by simulations windows 204. The IPC API 206 provides a way to probe simulation activity through memory probes 210 (including a memory probe GUI for viewing simulation activity). The IPC API 206 provides access to a conditions probe 212 that allows the simulation system to test the response of application software executing in a simulation window 204 to various conditions through error injection, plausibility checks, etc. The IPC API 206 provides simulation windows 204, through a communication protocol, a network probe 214 such as a controller area network (CAN) probe or Ethernet probe that simulates a CAN or Ethernet bus, respectively, in a real world vehicle. The IPC API 206 provides access to a simulator interface 216 for receiving inputs from a simulation model 112. The simulation model 112 could be plant models, sensor models, smart actuator models made by CAE modeling tools or simulation modeling tools (such as MATLAB and/or SIMULINK) that may simulate physical inputs as a real world ECU may receive from the environment (e.g., temperature, road properties, atmospheric conditions), captured by peripheral devices (e.g., sensors). The IPC API 206 provides access to a controller interface 218 for receiving inputs from a virtual controller 114 (e.g., ECU).

Figure 3:
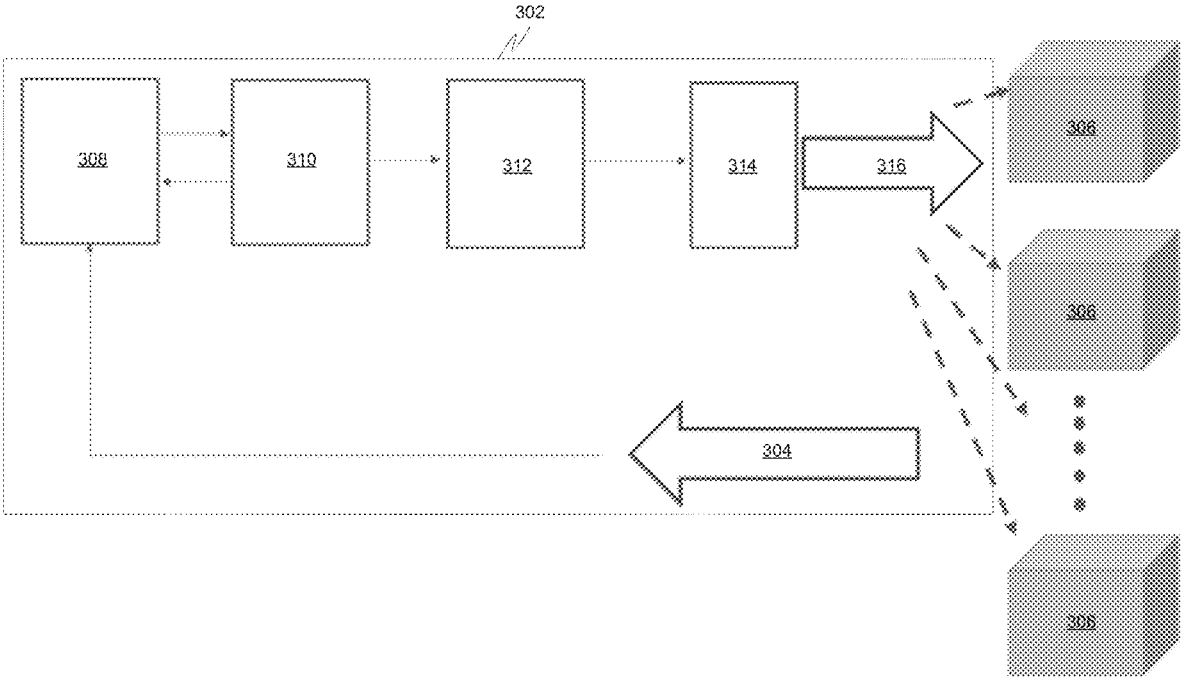
FIG. 3 is a block diagram depicting an example methodology implemented by an example IPC API for sharing hardware concurrent transactions for inter FMU communication, in accordance with an embodiment.

FIG. 3 is a block diagram depicting an example methodology 302 implemented by an example IPC API 206 for sharing hardware concurrent transactions for inter FMU communication (e.g., communication between VPs). The example methodology includes receiving communications 304 from one VP 306 that is directed to another VP 306. The example communications 304 are concurrent atomic transactions to transactional memory.

The example methodology 302 includes building a transmitter message signal circular queue (operation 308) for receiving the example communications 304, wherein a circular queue is a linear data structure in which the operations are performed based on FIFO (First In First Out) principle and the last position is connected back to the first position to make a circle. The example methodology 302 includes providing a balanced inter-processor communication (IPC) handler (operation 310) for handling all IPC in the transmitter message signal circular queue between the VPs, wherein IPC through shared memory is a concept where two or more process can access the common memory and communication is done via this shared memory where changes made by one process can be viewed by another process. The example methodology 302 includes building a multi-thread semaphore protected message circular queue (operation 312) for the IPC handled by the IPC handler, wherein a semaphore is a variable used by one thread to signal another thread. The example methodology 302 includes providing a shared IPC pool of Kernel objects handlers (operation 314). The Kernel objects handlers can, based on the IPC, schedule activations (operation 316) of the VPs 306.

Figure 4:
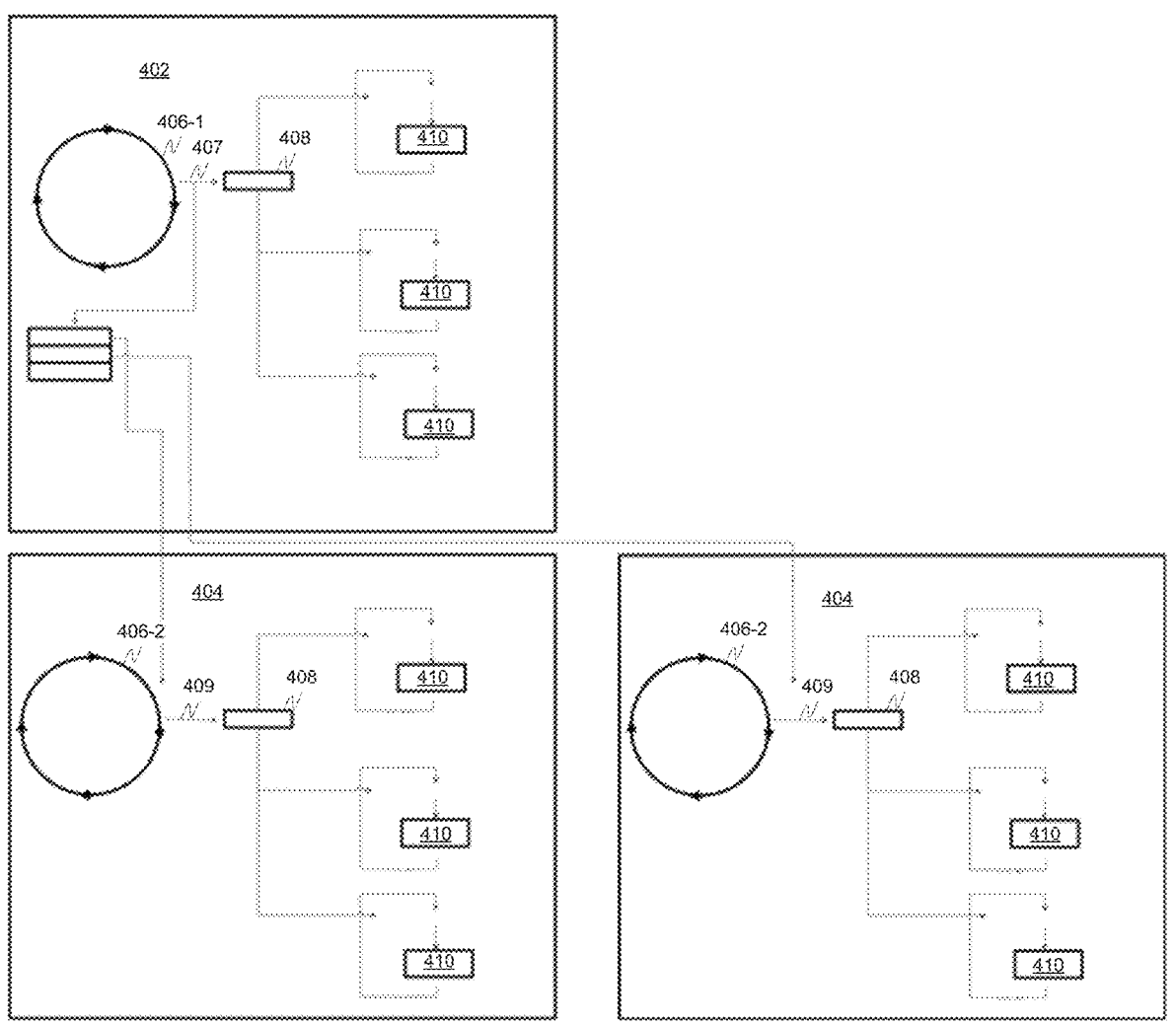
FIG. 4 is a block diagram depicting example timing synchronization between multiple FMUs, in accordance with an embodiment.

FIG. 4 is a block diagram depicting example timing synchronization between multiple FMUs. Depicted are a primary FMU process thread 402 and a plurality of secondary FMU process threads 404 (two shown in this example but could include many more).

Each FMU process thread 402, 404 includes a thread timer 406-1, 406-2 for providing a periodic clock signal 407, 409, of 0.5 milliseconds in this example, to a task timer 408 that is used to schedule the execution of various quantum tasks 410 for the associated FMU process. The thread timer 406-1 in the primary FMU process thread 402 functions as a master thread timer for all of the FMU process threads 402, 404. The thread timer 406-2 in the secondary FMU process threads 404 each receives the clock signal 407 from the master thread timer 406-1 and generates the clock signal 409 based thereon that is provided to the task timer 408 for the associated FMU process. The first FMU process to start is assigned to the primary process thread 402 and each subsequent FMU process is assigned to a secondary process thread 404. This arrangement provides multi-process FMUs all synchronized with a common clock.

FIG. 5 is a process flow chart depicting an example process 500 for simulating multiple virtual platforms concurrently. The order of operation within process 500 is not limited to the sequential execution as illustrated in the FIG. 5 but may be performed in one or more varying orders as applicable and in accordance with the present disclosure.

The example process 500 includes implementing a plurality of threads using a plurality of processor cores and an operating system that allocates a time quantum of a predetermined execution time to each thread during which the thread will not be preempted during execution (operation 502).

The example process 500 includes monitoring timing requirements of each of a plurality of tasks included in application code for a plurality of distinct virtual platforms (operation 504).

The example process 500 includes segmenting each of the plurality of tasks into one or more sequences of programmed instructions that can complete execution in a thread within a time quantum (operation 506).

The example process 500 includes providing the one or more sequences of programmed instructions for each of the plurality of tasks as a plurality of programmed instruction sequences with specific timing requirements (operation 508).

The example process 500 includes scheduling each of the plurality of programed instruction sequences, based on the specific timing requirements, to execute in one of the plurality of threads at an appropriate time (operation 510).

The example process 500 includes performing real-time simulation of application code utilizing available computing compacity at full capacity (operation 512).

The apparatus, systems, techniques, and articles disclosed herein provide a methodology for generating self-containing runnable FMUs that communicate with each other in the presence of other FMUs. The apparatus, systems, techniques, and articles disclosed herein can use Windows/Linux OS Kernel primitive's standard. The apparatus, systems, techniques, and articles disclosed herein provide a methodology for generating multithreaded, multi-process FMUs all synchronized with a common clock. The apparatus, systems, techniques, and articles disclosed herein provide a methodology for performing analysis and balancing schedulers for a Real-Time OS. The apparatus, systems, techniques, and articles disclosed herein provide a methodology for protecting hardware concurrent transactions for inter FMU communication. The apparatus, systems, techniques, and articles disclosed herein provide for the utilization of computing resources at full capacity.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A simulation system comprising:
a plurality of computing resources a plurality of processor cores; and
a memory that stores a plurality of programs comprising programming instructions that are configured to be executed by the plurality of processor cores and other files storing data for use by the plurality of programs, the plurality of programs and other files comprising:
an operating system comprising instructions to perform actions that implement a plurality of threads of execution (threads) using the plurality of processor cores, and allocate a time quantum of a predetermined execution time to each thread during which the thread will not be preempted during execution;
application code for at least 50 electronic control units (ECUs) in a motor vehicle, wherein the application code comprises at least 100 tasks that include a plurality of tasks for each ECU;
a simulation model comprising data that simulate inputs including braking and acceleration on for the application code;
a multi-thread scheduler comprising instructions to perform actions that:

monitor timing requirements of each of the at least 100 tasks included in the application code for the at least 50 ECUs, segment each of the at least 100 tasks into one or more sequences of programmed instructions that can complete execution in a thread within the time quantum, and provide the one or more sequences of programmed instructions for each of the at least 100 tasks as at least 100 programmed instruction sequences with specific timing requirements; and an environment manager comprising instructions to perform actions that schedule each of the at least 100 programed instruction sequences, based on the specific timing requirements, to execute in one of the plurality of threads at an appropriate time, the environment manager further comprising:

a time sync manager comprising instructions to perform actions that provide a plurality of simulation windows, the time sync manager configured by the instructions to retrieve each of the at least 100 programmed instruction sequences and schedule time synchronized execution of each of the at least 100 programmed instruction sequence in one of a plurality of simulation windows at an appropriate time in an available simulation window, wherein each of the plurality of simulation window is used to simulate execution of one or more of the at least 100 programmed instruction sequences in one of a plurality of simulation windows at an appropriate time in an available simulation window, and an inter-processor communication (IPC) API comprising instructions to perform actions that provide for inter-processor communication between programmed instruction sequences for different ECUs in different simulation windows, wherein the inter-processor communication between program instruction sequences for different ECUs in different simulation windows is provided through a transmitter message signal circular queue and a multi-thread semaphore protected message circular queue;

wherein the simulation system provides real-time simulation of application code for the at least 50 ECUs in the motor vehicle utilizing available processor cores at full capacity.

2. The simulation system of claim 1, wherein the IPC API facilitates communication between virtual platforms executing in different simulation windows based on:

receiving communications from one virtual platform that is directed to another virtual platform;

building the transmitter message signal circular queue for receiving the communications;

providing a balanced IPC handler for handling IPC in the transmitter message signal circular queue;

building the multi-thread semaphore protected message circular queue for the IPC handled by the IPC handler; and providing a shared IPC pool of Kernel objects handlers for scheduling virtual platform activations to receive communications.

3. The simulation system of claim 1, wherein the IPC API facilitates concurrent multi-domain simulation of multiple virtual platforms executing in different simulation windows through a network communication protocol.

4. The simulation system of claim 1, wherein the IPC API facilitates concurrent multi-domain simulation of multiple virtual platforms executing in different simulation windows through communication with a simulator.

5. The simulation system of claim 1, wherein the IPC API facilitates concurrent multi-domain simulation of multiple virtual platforms executing in different simulation windows through communication with a real world controller.

6. The simulation system of claim 1, wherein the IPC API facilitates concurrent multi-domain simulation of multiple virtual platforms executing in different simulation windows through providing a memory probe graphical user interface.

7. The simulation system of claim 1, wherein the IPC API facilitates concurrent multi-domain simulation of multiple virtual platforms executing in different simulation windows through providing a conditions probe.

8. The simulation system of claim 1, wherein each simulation window represents a functional mock-up unit (FMU) and a first executing FMU is designated as a primary FMU process and subsequent executing FMUs are designated as secondary FMU processes, wherein the primary FMU process generates a clock signal used for synchronizing the operation of quantum tasks in the primary FMU process and quantum tasks in the secondary FMU processes.

9. A method comprising:

providing a plurality of processor cores;

providing a memory that stores a plurality of programs comprising programming instructions that are configured to be executed by the plurality of processor cores and other files storing data for use by the plurality of programs, the plurality of programs comprising an operating system, a multi-thread scheduler, and an environment manager;

providing application code for at least 50 electronic control units (ECUs) in a motor vehicle, wherein the application code comprises at least 100 tasks that include a plurality of tasks for each ECU;

providing a simulation model comprising data that simulate inputs including braking and acceleration for the application code;

implementing a plurality of threads of execution (threads) using the plurality of processor cores through executing the operating system;

allocating a time quantum of a predetermined execution time to each thread during which the thread will not be preempted during execution through executing the operating system;

monitoring timing requirements of each of the at least 100 tasks included in the application code for the at least 50 ECUs through executing the multi-thread scheduler;

segmenting each of the at least 100 tasks into one or more sequences of programmed instructions that can complete execution in a thread within the time quantum through executing the multi-thread scheduler, and providing the one or more sequences of programmed instructions for each of the at least 100 tasks as at least 100 programmed instruction sequences with specific timing requirements through executing the multi-thread scheduler; and scheduling each of the at least 100 programed instruction sequences, based on the specific timing requirements, to execute in one of the plurality of threads at an appropriate time through executing the environment manager;

providing a plurality of simulation windows via a time sync manager of the environment manager configured by instructions to retrieve each of the at least 100 programmed instruction sequences and schedule time synchronized execution of each of the at least 100 programmed instruction sequences in one of a plurality of simulation windows at an appropriate time in an available simulation window, wherein each of the plurality of simulation windows is used to simulate execution of one or more of the at least 100 programmed instruction sequences in on one of a plurality of simulation windows at an appropriate time in an available simulation window;

providing inter-processor communication between programmed instruction sequences for different ECUs in different simulation windows via an inter-processor communication (IPC) API comprising instructions for providing a transmitter message signal circular queue and a multi-thread semaphore protected message circular queue; and performing real-time simulation of application code utilizing available computing compacity at full capacity.

10. The method of claim 9, wherein the IPC API facilitates concurrent multi-domain simulation of multiple virtual platforms executing in different simulation windows through a network communication protocol.

11. The method of claim 9, wherein the IPC API facilitates concurrent multi-domain simulation of multiple virtual platforms executing in different simulation windows through a network communication protocol.

12. The method of claim 11, further comprising facilitating communication between virtual platforms executing in different simulation windows based on:

receiving communications from one virtual platform that is directed to another virtual platform;

building the transmitter message signal circular queue for receiving the communications;

providing a balanced IPC handler for handling IPC in the transmitter message signal circular queue;

building the multi-thread semaphore protected message circular queue for the IPC handled by the IPC handler; and providing a shared IPC pool of Kernel objects handlers for scheduling virtual platform activations to receive communications.

13. The method of claim 9, wherein the IPC API facilitates concurrent multi-domain simulation of multiple virtual platforms executing in different simulation windows through a network communication protocol to a simulator.

14. The method of claim 9, wherein the IPC API facilitates concurrent multi-domain simulation of multiple virtual platforms executing in different simulation windows through providing a memory probe graphical user interface.

15. The method of claim 9, wherein the IPC API facilitates concurrent multi-domain simulation of multiple virtual platforms executing in different simulation windows through a network communication protocol to a real controller.

16. The method of claim 10, wherein each simulation window represents a functional mock-up unit (FMU) and a first executing FMU is designated as a primary FMU process and subsequent executing FMUs are designated as secondary FMU processes, wherein the primary FMU process generates a clock signal used for synchronizing the operation of quantum tasks in the primary FMU process and quantum tasks in the secondary FMU processes.

17. The method of claim 9, wherein the IPC API facilitates concurrent multi-domain simulation of multiple virtual platforms executing in different simulation windows through providing a conditions probe.

18. A non-transitory computer readable medium encoded with programming instructions configurable to cause a simulation system to perform a method, the method comprising:

providing a plurality of processor cores;

providing a memory that stores a plurality of programs comprising programming instructions that are configured to be executed by the plurality of processor cores and other files storing data for use by the plurality of programs, the plurality of programs comprising an operating system, a multi-thread scheduler, and an environment manager;

providing application code for at least 50 electronic control units (ECUs) in a motor vehicle, wherein the application code comprises at least 100 tasks that include a plurality of tasks for each ECU;

providing a simulation model comprising data that simulate inputs including braking and acceleration for the application code;

implementing a plurality of threads of execution (threads) using the plurality of processor cores through executing the operating system;

allocating a time quantum of a predetermined execution time to each thread during which the thread will not be preempted during execution through executing the operating system;

monitoring timing requirements of each of the at least 100 tasks included in the application code for the at least 50 ECUs through executing the multi-thread scheduler;

segmenting each of the at least 100 tasks into one or more sequences of programmed instructions that can complete execution in a thread within the time quantum through executing the multi-thread scheduler, and providing the one or more sequences of programmed instructions for each of the at least 100 tasks as at least 100 programmed instruction sequences with specific timing requirements through executing the multi-thread scheduler; and scheduling each of the at least 100 programed instruction sequences, based on the specific timing requirements, to execute in one of the plurality of threads at an appropriate time through executing the environment manager;

providing a plurality of simulation windows via a time sync manager of the environment manager configured by instructions to retrieve each of the at least 100 programmed instruction sequences and schedule time synchronized execution of each of the at least 100 programmed instruction sequences in one of a plurality of simulation windows at an appropriate time in an available simulation window, wherein each of the plurality of simulation windows is used to simulate execution of one or more of the at least 100 programmed instruction sequences in on one of a plurality of simulation windows at an appropriate time in an available simulation window;

providing inter-processor communication between programmed instruction sequences for different ECUs in different simulation windows via an inter-processor communication (IPC) API by:

receiving communications from one virtual platform that is directed to another virtual platform, wherein the one and another virtual platforms executing in different simulation windows;

building a transmitter message signal circular queue for receiving the communications;

providing a balanced IPC handler for handling IPC in the transmitter message signal circular queue;

building a multi-thread semaphore protected message circular queue for the IPC handled by the IPC handler; and providing a shared IPC pool of Kernel objects handlers for scheduling virtual platform activations to receive communications;

wherein the IPC API facilitates concurrent multi-domain simulation of multiple virtual platforms executing in different simulation windows through a network communication protocol;

wherein the IPC API facilitates concurrent multi-domain simulation of multiple virtual platforms executing in different simulation windows through communication with a simulator;

wherein the IPC API facilitates concurrent multi-domain simulation of multiple virtual platforms executing in different simulation windows through communication with a real world controller;

wherein each simulation window represents a functional mock-up unit (FMU) and a first executing FMU is designated as a primary FMU process and subsequent executing FMUs are designated as secondary FMU processes, wherein the primary FMU process generates a clock signal used for synchronizing the operation of quantum tasks in the primary FMU process and quantum tasks in the secondary FMU processes; and performing real-time simulation of application code utilizing available computing compacity at full capacity.

19. The non-transitory computer readable medium of claim 18, wherein the IPC API facilitates concurrent multi-domain simulation of multiple virtual platforms executing in different simulation windows through providing a memory probe graphical user interface.

20. The non-transitory computer readable medium of claim 19, wherein the IPC API facilitates concurrent multi-domain simulation of multiple virtual platforms executing in different simulation windows through providing a conditions probe.

*     *     *     *     *